United States Patent [19]

Stone

[11] Patent Number: 5,403,679
[45] Date of Patent: Apr. 4, 1995

[54] MODULAR BATTERY CABINET ASSEMBLY

[75] Inventor: Bradley W. Stone, Elgin, Ill.

[73] Assignee: GNB Industrial Battery Co., Lombard, Ill.

[21] Appl. No.: 265,500

[22] Filed: Jun. 23, 1994

Related U.S. Application Data

[63] Continuation of Ser. No. 898,299, Jun. 15, 1992, abandoned.

[51] Int. Cl.⁶ .............................................. H01M 2/10
[52] U.S. Cl. ..................................... 429/99; 429/100; 429/159; 206/333; 206/512
[58] Field of Search ...................... 429/99, 100, 96, 9, 429/159; 206/333, 512

[56] References Cited

U.S. PATENT DOCUMENTS

| | | | |
|---|---|---|---|
| H985 | 11/1991 | Christopulos . | |
| 1,152,247 | 8/1915 | Walker . | |
| 2,916,161 | 12/1959 | Schaefer | 206/512 X |
| 2,942,058 | 6/1960 | Herold | 429/99 |
| 3,167,458 | 1/1965 | Brazell . | |
| 3,309,235 | 3/1967 | Teeple . | |
| 3,342,645 | 9/1967 | Godard et al. . | |
| 3,623,917 | 12/1969 | Chassoux . | |
| 3,846,178 | 11/1974 | Evjen et al. . | |
| 4,041,216 | 8/1977 | Desplanches et al. . | |
| 4,113,926 | 9/1978 | McBrien | 429/99 |
| 4,529,088 | 7/1985 | Quone | 206/512 X |
| 4,957,829 | 9/1990 | Holl . | |
| 4,994,940 | 2/1991 | Thouvenin et al. . | |
| 5,017,441 | 5/1991 | Lindner | 429/9 |
| 5,034,290 | 7/1991 | Sands et al. . | |
| 5,140,744 | 8/1992 | Miller | 429/99 X |

FOREIGN PATENT DOCUMENTS

| | | |
|---|---|---|
| 180285 | 6/1959 | France . |
| 1336265 | 7/1963 | France . |
| 1459178 | 10/1966 | France . |
| 569865 | 2/1933 | Germany . |
| 2044983 | 10/1980 | United Kingdom . |
| 2062947 | 5/1981 | United Kingdom . |
| 2225670 | 11/1992 | United Kingdom . |

OTHER PUBLICATIONS

Electrical Review p. 270, Feb. 15, 1946.

Primary Examiner—John S. Maples
Attorney, Agent, or Firm—Leydig, Voit & Mayer

[57] ABSTRACT

The present invention comprises a modular battery tray comprising a series of battery modular trays attached together, each tray comprising a back section and opposing side sections configured to provide access between the opposing side sections, at least one of the sections having battery compartments in which the battery is restrained from movement, as desired. In the preferred embodiment, a top cover and a front access door are included, as is a base so as to provide a battery cabinet assembly that may be readily moved and which restricts access.

34 Claims, 8 Drawing Sheets

MODULAR BATTERY CABINET ASSEMBLY

This is a continuation of application Ser. No. 07/898,299, filed on Jun. 15, 1992, now abandoned.

BACKGROUND OF THE INVENTION

1. Field Of The Invention

This invention relates to lead-acid batteries and, more particularly, to a battery cabinet for sealed-maintenance-free, lead-acid batteries used in rapid recharging applications.

2. Description Of The Prior Art

Sealed lead-acid stationary batteries are widely used in commerce today. Stationary batteries are specifically designed for float applications, that is, as standby power in the event of a power failure. Stationary batteries are maintained at a full state-of-charge and in a ready-to-use condition, typically by floating at a constant preset voltage. Stationary batteries are used for standby or operational power in a wide variety of applications, including, by way of illustration, in telecommunications, utilities, for emergency lighting in commercial buildings, as standby power for cable television systems and in uninterruptible power supplies.

Uninterruptible power supplies are systems that back up computers and communications networks. Sealed lead-acid batteries may comprise the power source. The uninterruptible power source allows for the orderly shutdown of computers when there is a sudden interruption in the primary electrical source, such as during a power outage, and provides back-up power for communications networks. The uninterruptible power supply also will accommodate short, or intermittent losses in power. When there is a power interruption, the batteries in the uninterruptible power system can be subject to rapid discharge.

There are numerous applications where batteries designed for use in moderate rate discharge modes are utilized. While the number can vary substantially, many of such applications require anywhere from 8 to 40 batteries. Accordingly, floor space, and sometimes even the height, required for the batteries can present problems. To attempt to minimize the floor space required, it is conventional to position the batteries in various kinds of racks or cabinets. Typically, the battery cabinets that are now being used position the batteries only in a vertical orientation. The available battery racks and cabinets are generally relatively complex to assemble and maintain.

Maintenance, testing and replacement in use require that any battery cabinet or rack provide ready accessibility to each battery. Changing requirements often require moving the application location so the ability to readily move the batteries is important. This is particularly acute because the batteries used for standby power and similar applications are heavy and bulky.

It is also of extreme importance to ensure that appropriate safety standards are satisfied. Further, for locations where high seismic conditions can occur, there are additional standards which must be met.

Still further, there are so many applications requiring different combinations of batteries that manufacture, inventory control, and installation can become quite complex. Yet, despite the need, there is no battery cabinet assembly system available which can be inexpensively manufactured, that offers enhanced inventory control, that is also modular in construction, and which may be easily installed and moved after installation.

It is accordingly a principal object of the present invention to provide a battery cabinet assembly that is modular and allows systematic manufacture, assembly, installation and adaptability to a wide variety of locations and applications.

It is a further object of this invention to provide a modular battery cabinet system that minimizes the necessary floor space, yet allows ready accessibility to each battery.

A further object lies in the provision of a modular battery system that securely retains the individual batteries, even under high seismic condition standards.

Another and more specific object of the present invention provides a modular cabinet assembly that may be readily moved from one location to another.

These and other objects and advantages of the present invention will be apparent from the following description and drawings.

SUMMARY OF THE INVENTION

In its broadest aspects, the present invention provides a modular battery stack comprising a plurality of battery trays. Each battery tray comprises three sections, including a back section and opposing side sections. The resulting configuration allows access to the front of each section. Depending upon the size of the batteries involved, two or three of the sections are divided into individual battery compartments. Each of the battery compartments includes restraining means to hold the battery in the desired position. Most preferably, the restraining means prevent the battery from front-to-back, side-to-side and up-and-down movement within the battery compartment. The battery trays can be joined together as are needed to provide the requisite number of batteries for the particular application.

A more specific embodiment of the present invention includes a top cover and a front door that restricts access. Additionally, in a preferred embodiment of the present invention, the modular battery stack is assembled onto a base. The base then allows the thus-constituted modular battery cabinet assembly to be moved as desired from one location to another, as by means of a forklift truck or the like.

Viewed from another perspective, the present invention comprises a systematic, modular approach that simplifies manufacture, inventory control, assembly and movement of the requisite number of batteries for applications having widely varying requirements.

DETAILED DESCRIPTION OF THE INVENTION

Figure 1:
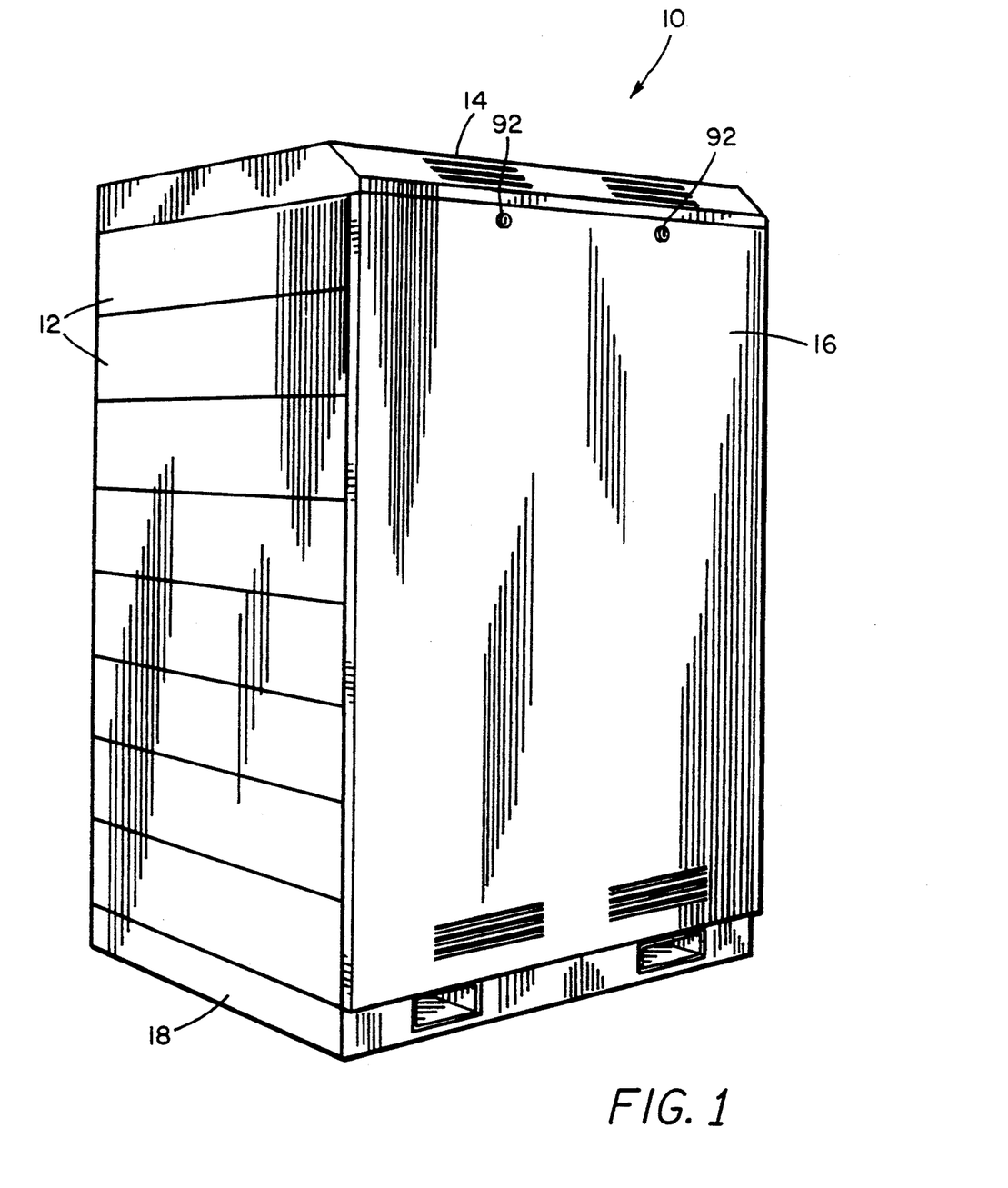
FIG. 1 is a perspective view of a preferred embodiment of a battery cabinet assembly in accordance with the present invention.

FIG. 1 shows one embodiment of a battery cabinet assembly of the present invention. The battery cabinet assembly 10 illustrated comprises a series of battery trays 12, a top cover 14, a front door 16 and a base 18.

Figure 2:
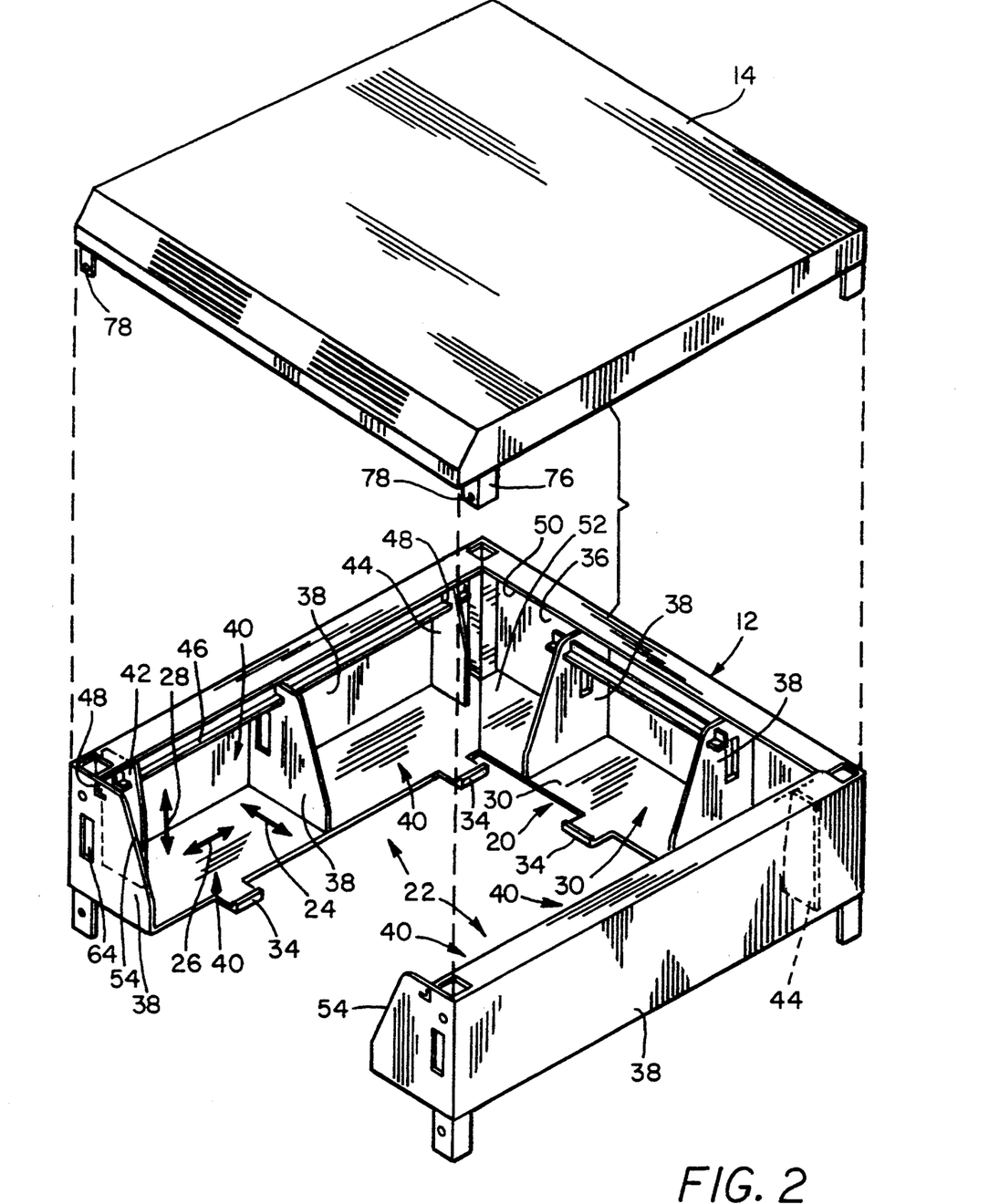
FIG. 2 is an exploded perspective view and showing a battery tray used in the battery cabinet assembly shown in FIG. 1 and the top cover for the assembly.

In accordance with one aspect of the present invention, the system utilized includes as a fundamental unit a battery tray capable of retaining multiple batteries. The configuration of the battery tray is such that, for the size and number of batteries involved, the floor space required is minimized together with the height while still allowing ready access to each battery. To this end, and as is shown in FIG. 2, the battery tray 12 comprises a back section 20 and adjoining and opposing side sections 22. Each section in this embodiment includes at least one battery compartment area. In the illustrative embodiment, each opposing side section 22 includes two battery compartment areas while the back section 20 has a single battery compartment area.

According to one feature of the present invention, battery restraining means are provided that prevent the battery positioned in the battery tray from undesired movement. More specifically, as shown in FIG. 2, movement from front-to-back as shown by arrow 24, from side-to-side as indicated by arrow 26, and from bottom-to-top as is shown by arrow 28, may be restrained. It will be preferred to secure the individual battery from movement in all three axes since, in accordance with this invention, the restraining means utilized will satisfy the standards required for locations where high seismic conditions can occur. However, it may be adequate for some applications to simply secure the battery from movement in two of the three axes or, perhaps in some applications, just in one axis.

In the illustrative embodiment, the restraining means comprises two components. First of all, in the battery compartment 30 in back section 20, undesired front-to-back and side-to-side movement is prevented by a suitably dimensioned battery compartment defined by the battery compartment base 30, upstanding lip 34 extending from battery compartment base 30, end wall 36 and opposing side walls 38.

The battery compartments 40 in the side sections 22 are similar. However, one of the sidewalls of each battery compartment 40 is cut-back from the front of the compartment. Cut-back sidewalls 42 and 44 are thus provided. Cut-back sidewall 42 is spaced from sidewall 38 to allow the top restraining means to be locked in place. Cut-back sidewall 44 allows the battery to be more readily removed from that battery compartment. The various battery compartments are dimensioned so that the battery to be housed fits snugly therein.

The other component of the restraining means in the embodiment shown comprises an L-shaped rod 46. Rod 46 is positioned in complementally-shaped apertures 48 located in the sidewalls 38, 42 and 44 so that, when in place, rod 46 is positioned against the top of the battery. Rod 46 can be locked in place by any conventional means such as by a cotter pin. The space between cutback sidewall 42 and the adjacent sidewall 38 is adequate to allow inserting the cotter pin.

It should be appreciated that other restraining means may be used. For example, flexible strap or straps may be utilized to connect the top face 50 and the bottom face 52 of the battery compartment. In such an embodiment, a detachable strap or straps can be provided so that the battery may be readily removed simply by detaching the strap, attaching a handle (if desired) to the battery and then lifting the battery out of the battery compartment. An embodiment of this type, while perhaps not as aesthetically pleasing, allows a battery to be more readily removed when that is required than does the illustrative embodiment.

Because of the weight of the batteries, it is often desired to utilize batteries in the battery cabinet system of this invention that have slots or other attachment means so that a handle can be affixed to the battery when the battery must be removed from the modular tray. Accordingly, pursuant to the preferred embodiment of this invention, to facilitate attachment of the handle, side walls 38 are angled as is shown at 54. This allows personnel to more readily attach the handle, typically achieved by tilting the battery forward and resting it on the upstanding lip 34. Once the handle is attached, the battery can then simply be lifted out of the battery compartment.

Figure 6A:
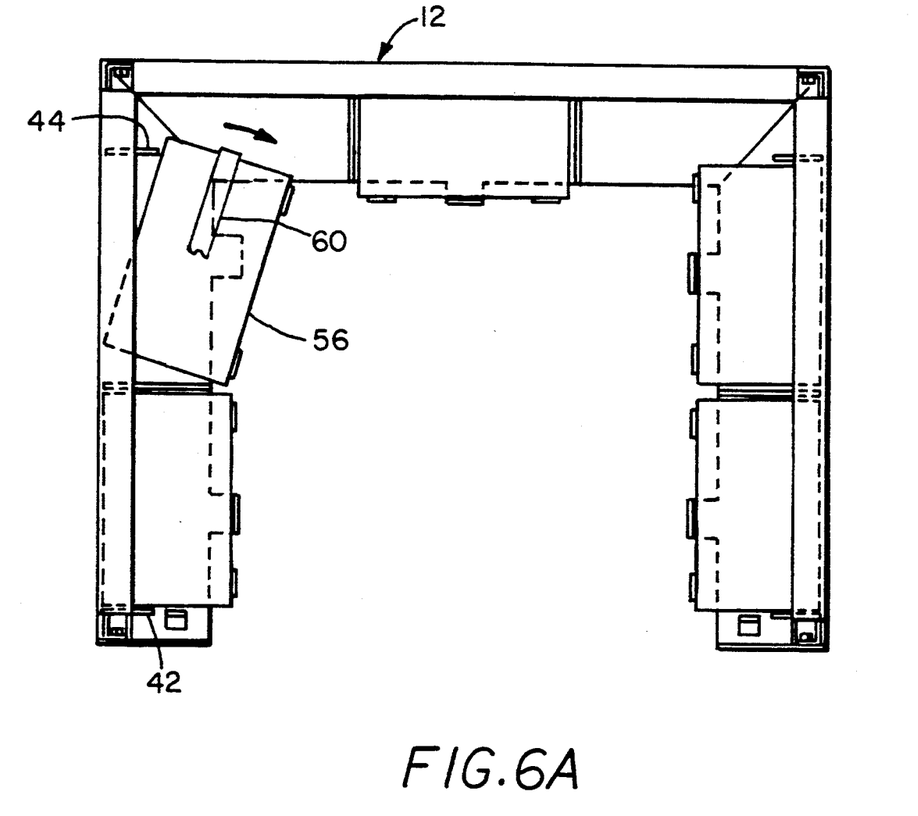
FIGS. 6A–C are top elevation views of the illustrative modular battery tray (FIGS. 6B and 6C being fragmentary) and showing how a handle is attached to a battery for removing that battery from the tray.
Figure 6B:
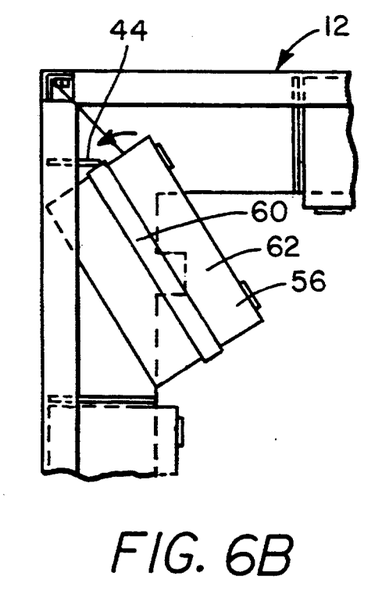
Figure 6C:
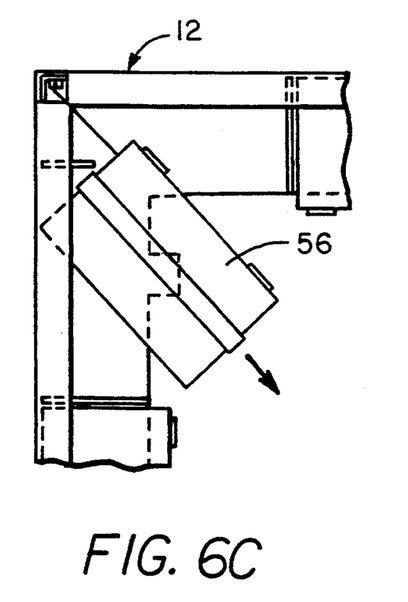

Further, as may be appreciated, the battery positioned in compartment 40 and the battery positioned in adjacent battery compartment 30 of the back section will be quite close together, particularly when, in accordance with the preferred embodiment of this invention, the footprint of the battery cabinet is minimized. In such an embodiment, the side panel 44 is cut back. As shown in FIG. 6A–C, a battery 56 in the battery compartment 40 adjacent battery compartment 30 can be lifted onto the lip 34 and partially rotated to attach a handle 60 to one side as shown in FIG. 6A. The battery 56 is thereafter rotated the other way to the position shown generally at 62 in FIG. 6B to attach the handle to the other side of the battery 56. The battery 56 is then in position to be lifted out of the compartment as shown in FIG. 6C.

Pursuant to one aspect of the present invention, thermal management of the batteries is assisted by allowing air movement from battery compartment to the adjoining battery compartment. In the embodiment illustrated, air movement is facilitated by use of apertures 64 in side panels 38. With suitable dimensioning and because of the taper provided in batteries of this type, air can enter through apertures 64, circulate around the side of the battery, move over the battery and then exit through the aperture on the other side of the compartment. As may be appreciated, the relative openness of the top of the battery compartment due to the compact L-shaped top restraining means employed assist in enhancing thermal management.

Figure 3:
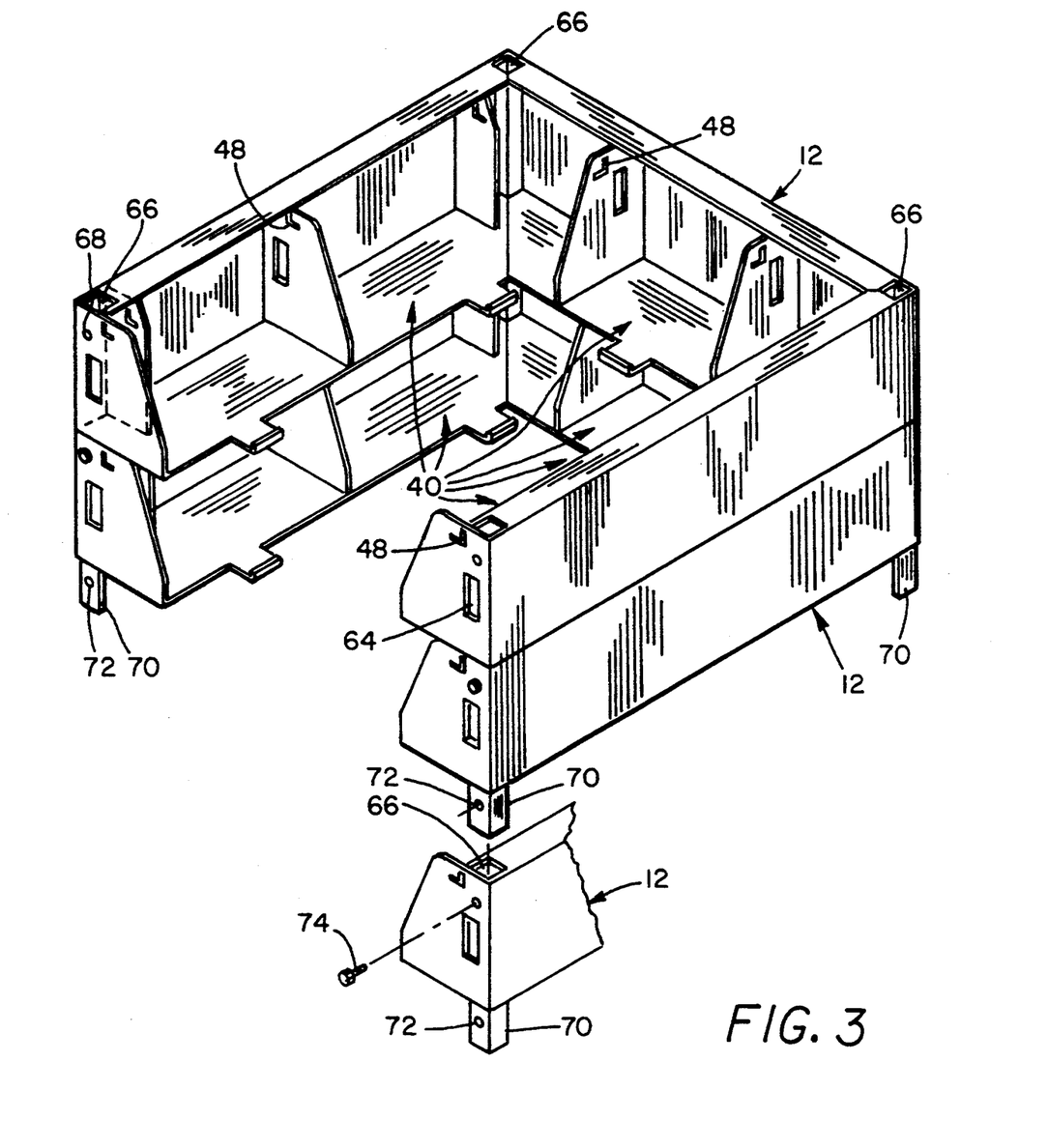
FIG. 3 is a perspective view and illustrating how adjacent battery trays of the illustrative embodiment may be joined together.

Each battery tray module 12 provides attachment means for connection to another module so that the requisite number of batteries for the particular application can be assembled. In the illustrative embodiment, as is shown in FIGS. 2 and 3, the attachment means comprises a channel member 66 having holes 68 for bolting into an adjacent tray module. Thus, the upper battery tray module is bolted to a lower module by an attachment extension 70 that fits into channel member 66 and includes holes 72 which align with holes 68 in channel member 66. After the trays are stacked in place, bolts 74 can attach the trays together. To allow one person to be able to readily assemble the cabinet, weld nuts can be affixed to the respective holes, thus particularly simplifying bolting the attachment sections 70 that are located at the battery tray corners of the back section 20.

The illustrative embodiment of the modular battery tray attachment means is believed to be highly desirable, combining structural simplicity with ease of assembly. However, other attachment means may, of course, be utilized, if desired. Indeed, given the structure of the modular trays, other means for allowing suitable attachment of one modular tray to another may be readily understood.

As may be appreciated, when a number of battery tray modules are attached together as is shown in FIG. 1, the height can be significant. However, as will be discussed more fully hereinafter, access to each battery is readily provided due to the C-shaped or "telephone booth" type of configuration.

Figure 8:
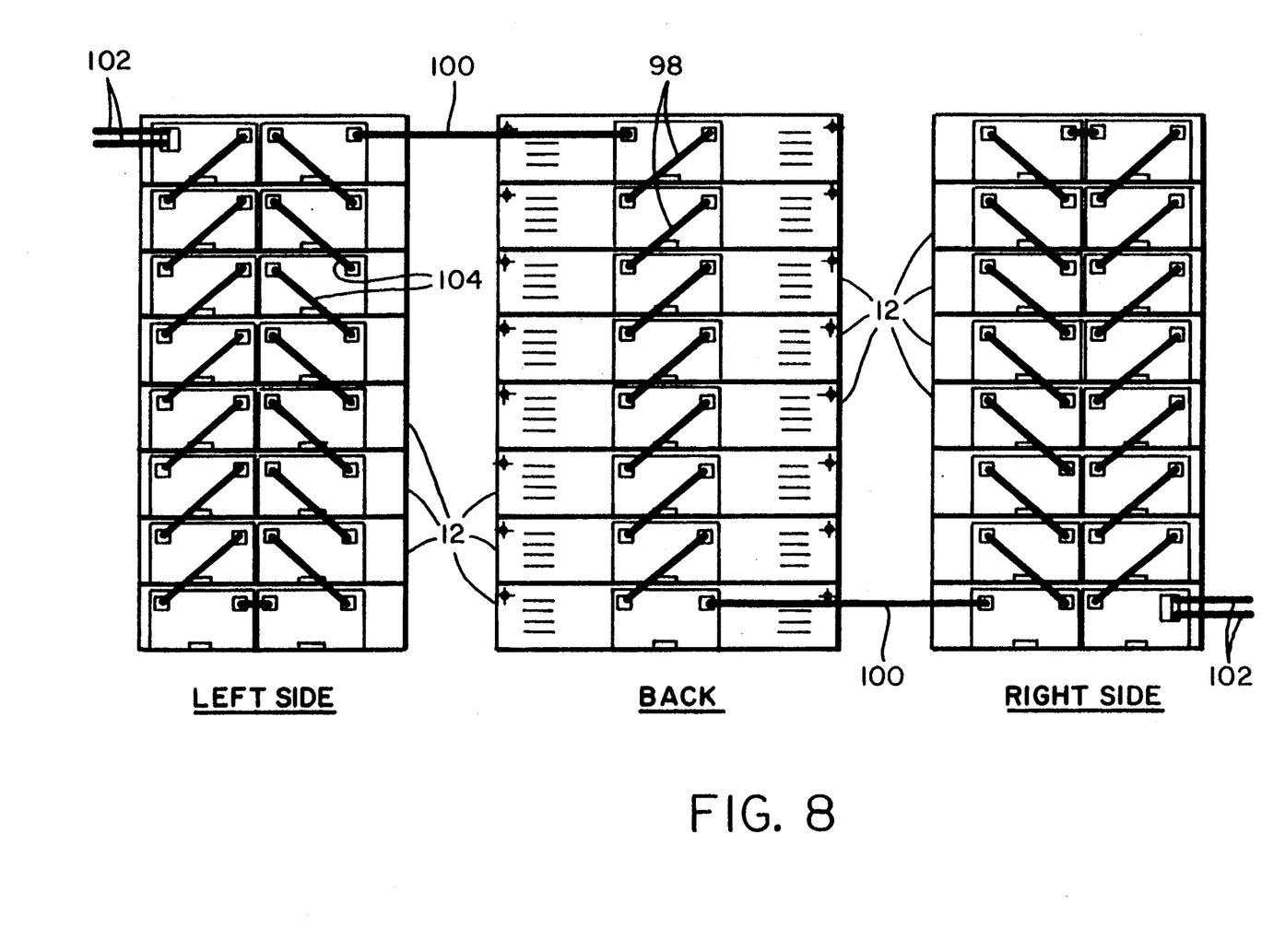
FIG. 8 is a schematic view and illustrates one electrical connection mode for the battery cabinet shown in FIG. 1.

Access to the battery terminals is, of course, enhanced when the terminals are located on the side of the cover (as shown in FIG. 8), rather than on the top of the cover. Batteries with this configuration are commercially available. However, when sealed lead-acid batteries are utilized, such batteries can be used in any orientation. It is particularly preferred to utilize the batteries described in the co-pending Cole et al. application, Ser. No. 07/803,498, filed Dec. 4, 1991, assigned to the assignee of the present invention. In the embodiment shown, the batteries are turned on their side so that the terminals are in the desired position.

Pursuant to yet another aspect of the present invention, a top cover may optionally be employed. While unnecessary to the objective of providing an efficient stacking arrangement for a large number of batteries, utilizing the cover of this invention satisfies other desirable objectives. Thus, in accordance with this invention, employing a cover is necessary to provide the required structural integrity to satisfy Zone 4 applications, to limit access to the cabinet from the top and to add to the aesthetics, while allowing an area where maintenance, performance testing and like apparatus may be mounted, if desired. To this end, and as is shown in FIG. 2, a cover is provided with means for attaching the cover to the top battery tray.

As shown in FIG. 2, cover 14 thus includes corner extensions 76 with holes 78. Attaching the cover to the top battery tray is accomplished in the same fashion as adjacent battery trays are attached. Corner extensions 76 thus fit into channels 66 of the battery tray, holes 78 align with holes 68, and the top is then bolted to the top battery tray.

Yet another optional, but preferred, feature of this invention comprises a base which not only enhances the aesthetics, but also allows greater mobility. Further, structural integrity can be enhanced by providing a facile method for attaching the cabinet to the floor, as well as simplifying attachment of an optional front door.

Figure 4:
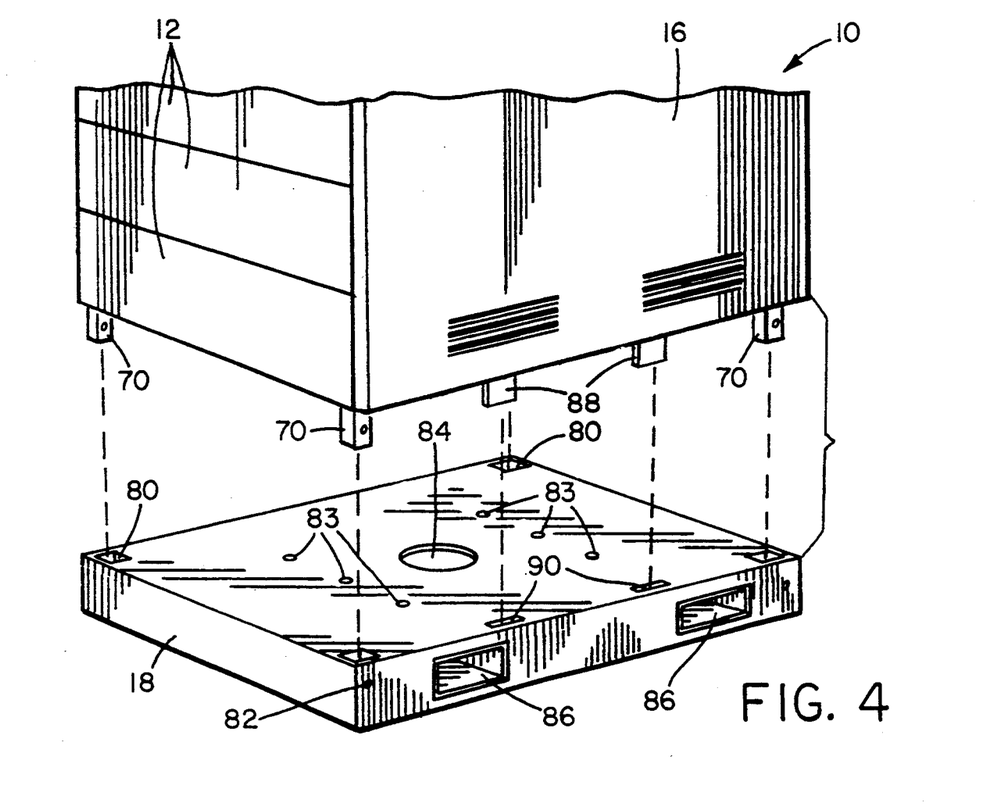
FIG. 4 is a partial perspective view and shows a base upon which the modular battery stack can be mounted for ready movement.

Thus, in the illustrative embodiment shown in FIG. 4, base 18 includes channel openings 80 with holes 82. Extension members 70 of the bottom battery tray 12 fit into channel openings 80, with holes 72 of extension members 70 aligning with holes 82. The thus-mounted stack of battery trays can then be bolted or otherwise attached to base 18. If desired, means can be provided to allow the base 18 to be bolted or otherwise attached to a floor. The base 18 may thus be provided with holes 83 for bolts for attaching to the floor.

Other optional features of the base include base aperture 84. Base aperture 84, when used, should be sized for power cables for connecting to another cabinet or to a power source, or for other connections.

Another optional feature includes provisions for allowing the cabinet to be moved more readily. Spaced openings 86 may thus be included so that the entire cabinet assembly can be picked up by a forklift truck or the like. Alternatively, if desired, base 18 could be provided with casters or the like so as to allow the cabinet to be rolled from one location to another.

Of course, the bottom modular tray need not have attachment means extending below the modular tray or such attachment means can be wholly eliminated. In such a case, the modular tray stack would rest on the bottom tray, or on a base separate from the modular tray stack.

So as to provide an aesthetically desirable appearance, and to restrict unauthorized access and inadvertent damage to the batteries, a front door can be provided for the battery cabinet assembly. When utilized, any type of a cover that closes off the open access into the interior of the cabinet may be utilized.

Figure 5:
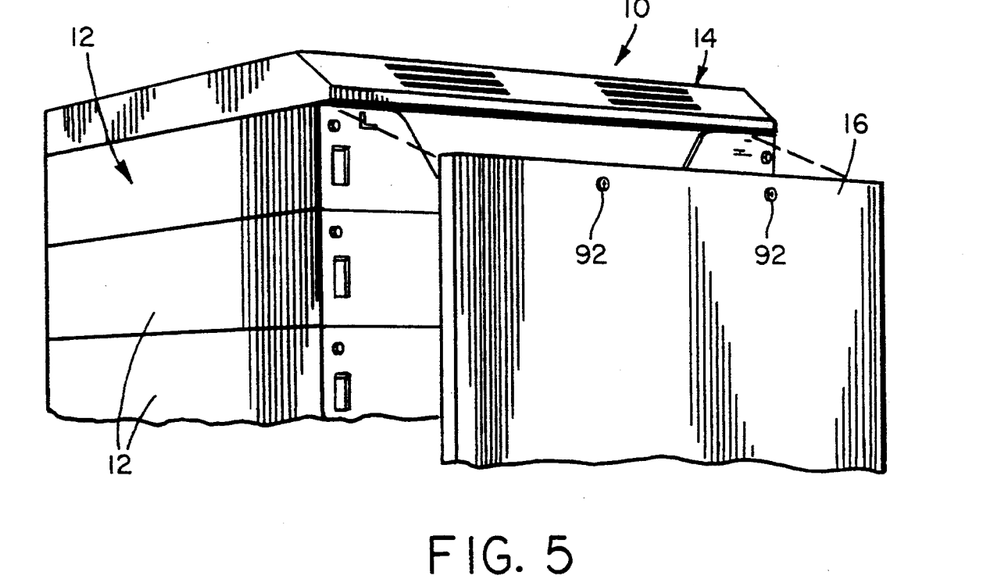
FIG. 5 is a partial perspective view and illustrates how the front door is attached to the modular battery stack in the embodiment illustrated.

In the embodiment shown in FIGS. 4 and 5, front door 16 has a pair of tabs 88 that fit into cover apertures 90 in base 18 (FIG. 4). In the preferred embodiment (FIG. 5), key latches 92 located adjacent the top of front door 16 are used to attach the front door to the stacked modules and to restrict unauthorized access. Many types of key latches are known, and any of these may be utilized.

When the key is placed in the key latches and turned, the front door may then be lifted off, providing access to the interior. This configuration avoids the nuisance of an open hinged cover door inadvertently swinging closed. However, a hinged front door could be utilized if desired.

Figure 7:
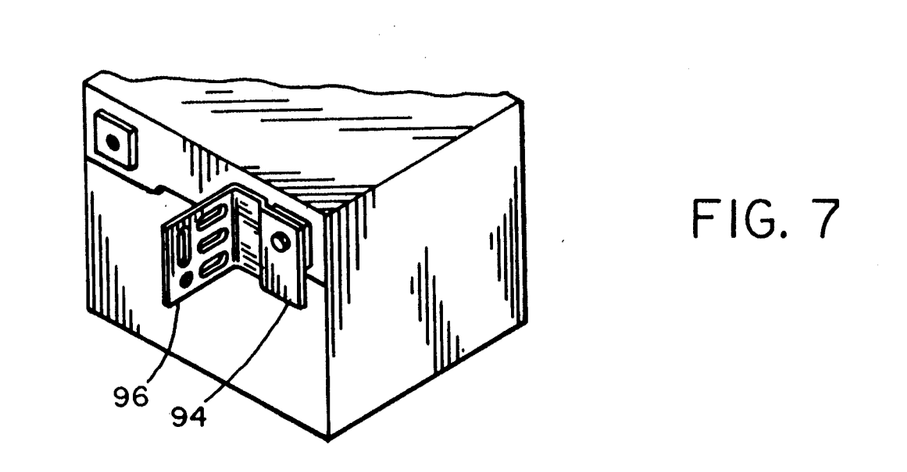
FIG. 7 is a perspective view of a battery and shows a terminal plate that may be utilized.

To provide a suitable connection for the terminals to the electrical connection outside of the cabinet itself, any type of a terminal plate or external connection may be utilized. In the embodiment illustrated in FIG. 7, a terminal plate mounting bracket 94 and terminal plate 96 are used. The desired power cables or the like can then be attached to terminal plate 96, as is known.

The particular electrical connections that are made between the batteries will, of course, be dependent upon the power requirements for the particular application. The battery cabinet assembly of this invention allows electrical connections to be readily made, whether series parallel, or both series and parallel configurations are desired.

One configuration for the electrical connections is schematically shown in FIG. 8. For ease of illustration, back section 20 is also labelled "BACK" while opposing side sections 22 are designated "LEFT SIDE" and "RIGHT SIDE" referring respectively to side section 22 on the left and side section 22 on the right side when one is facing back section 20. Connectors 98 show the terminal-to-terminal connections, while section connectors 100 electrically connect the batteries in one section to those in the adjacent section. Power cables 102 depict the output connections for the positive and negative terminals from the overall battery configuration.

As has been seen, the electrical connections made from battery-to-battery in the FIG. 8 configuration are between batteries in adjacent modules. With this arrangement, the wiring necessary cannot be carried out until the configuration needed for a particular application is known.

However, in accordance with an optional aspect of this invention, a configuration can be employed wherein the batteries within a particular module can be electrically connected together. In this fashion, all that need be done when the requirements of a particular application become known is to stack the necessary number and types of modules and make the module-to-module connections.

Figure 9:
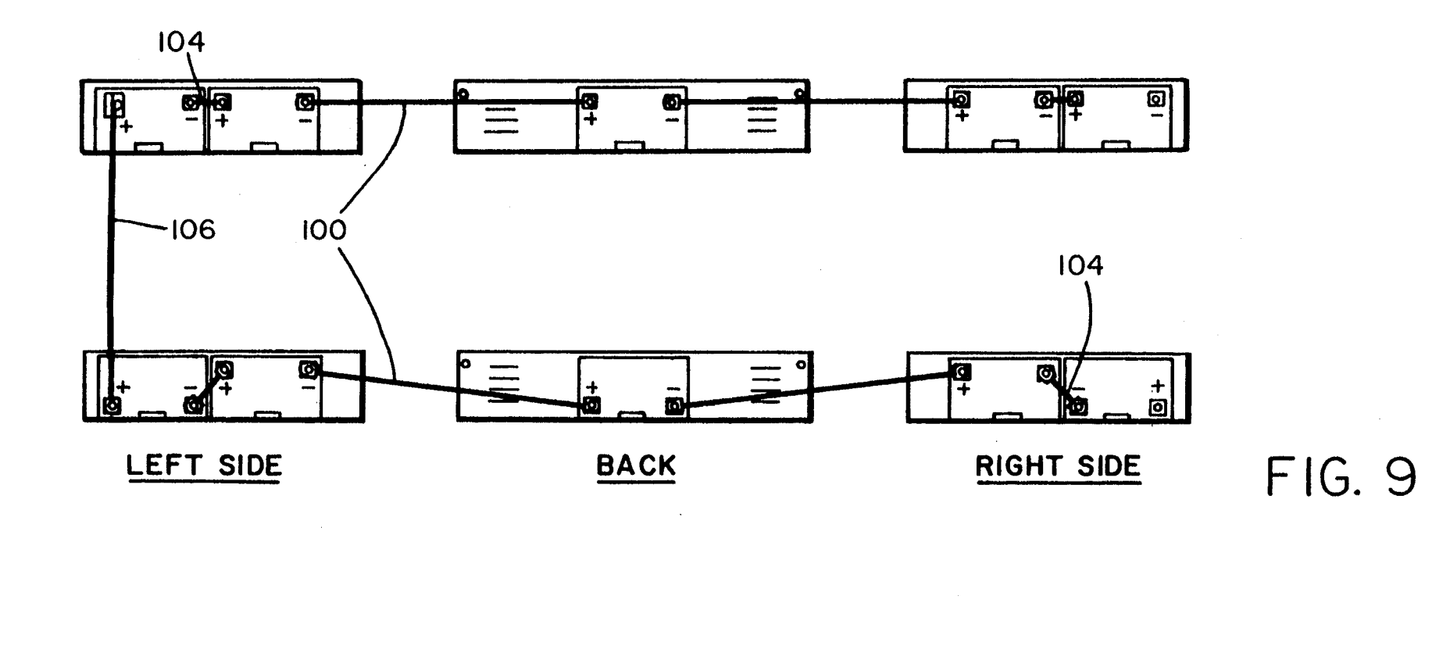
FIG. 9 is a schematic view showing a modular battery tray in accordance with this invention in which the batteries being housed in the modular tray are electrically connected together in one mode.

To this end, FIG. 9 shows one configuration in which the batteries in a module can be pre-connected. As shown, the various sections are the same designations as employed in FIG. 8. In each battery tray module 12, the batteries 56 are connected to each other with connectors 104. Module-to-module connection is made via connectors 106. Depending upon the requirements, other configurations may be necessary. There are two other configurations that can be used, yet still allowing an individual battery tray module to be pre-connected.

As can be seen in FIG. 9, the pre-connected module arrangement shown involves positioning some of the batteries in an inverted position. Sealed lead-acid batteries may, of course, be used in any position. However, satisfying suitable electrical codes may require resting the inverted battery on an insulating layer. Many types of insulating layers are known and may be used.

The size and performance characteristics of batteries used for standby power applications, particularly for the moderate rate applications, can vary considerably. The embodiment shown in FIGS. 1–9 will be generally preferred for batteries of the larger sizes.

However, as may be appreciated, the number of batteries in each module can be varied as desired. Sizing a battery tray to hold five batteries is accordingly somewhat arbitrary, but does allow 40 batteries to be located in one cabinet assembly while providing stability and structural integrity for Zone 4 applications. A cabinet of this size will satisfy the power requirements for many applications.

When batteries of a smaller size are to be used, an alternative battery tray configuration may be used. As is thus shown in FIG. 10, the battery tray module illustrated has the same general configuration as the embodiment of FIGS. 1–9. For simplicity of discussion, the same numerals are used for the same components. Thus, the battery tray 12 includes a series of back section battery compartments 30 and side section battery compartments 40. The respective battery compartments are configured as in the FIGS. 1–9 embodiment, and the tray-to-tray attached is likewise identical.

Figure 10:
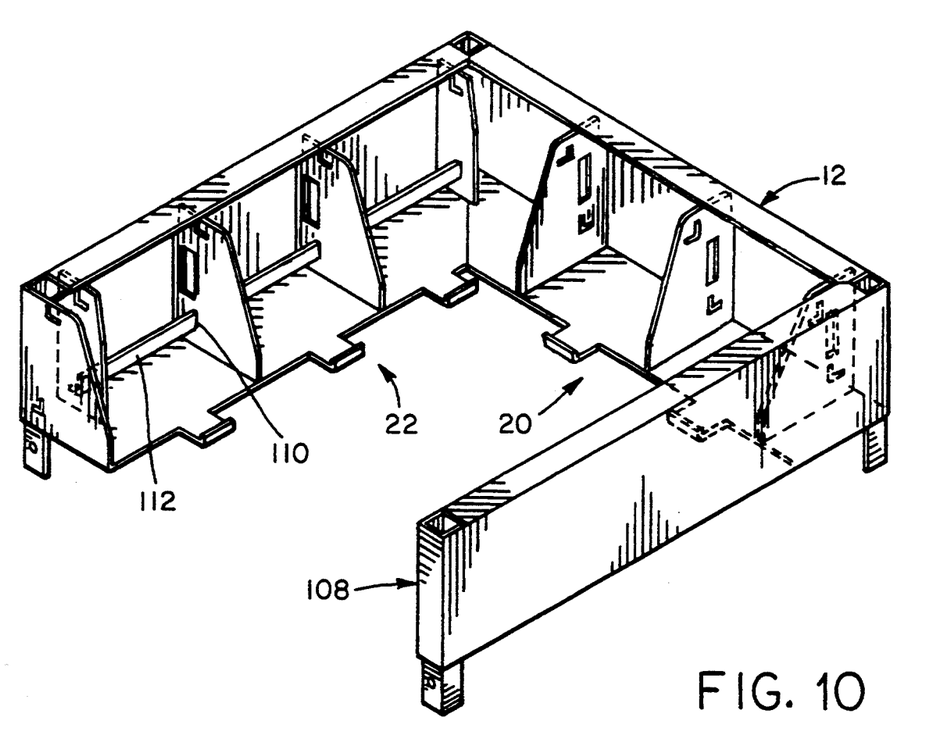
FIG. 10 is a perspective view showing an alternative embodiment of a battery tray for use with batteries of somewhat smaller dimension than those with which the battery tray of FIG. 2 is used.

However, because the embodiment of FIG. 10 is designed to accommodate smaller-sized batteries, five batteries can be accommodated in a tray without providing all three sections with battery compartments.

Thus, back section 20 in this embodiment accommodates two batteries while side section 22 accommodates three batteries. Opposing side section 108, however, has no battery compartments, simply including the necessary attachment means for stacking and attaching another tray.

Figure 11:
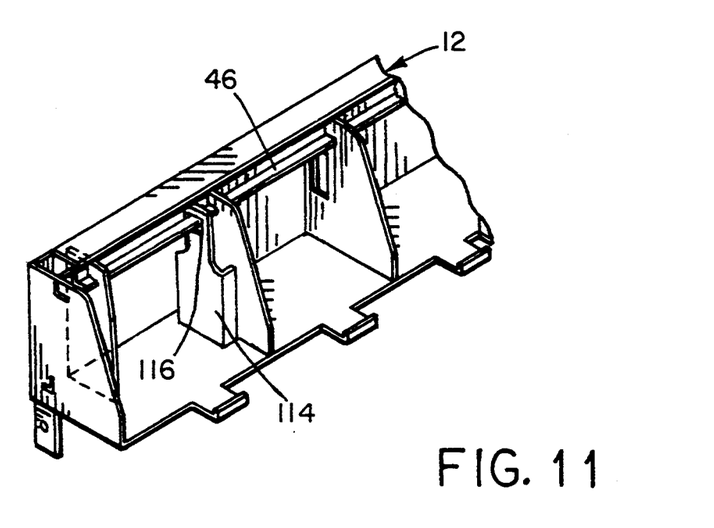
FIG. 11 is a fragmentary perspective view of a battery tray and showing a spacer that can be used for accommodating a smaller-size battery.

In accordance with yet another aspect of the present invention, spacers can be provided so that a single battery compartment can be readily altered to securely hold smaller-size batteries. Thus, as is shown in FIG. 10, apertures 110 and depth spacer bar 112 decreases the depth of the battery compartment. Further, and as is shown in FIG. 11, side spacer 114 decreases the width of the battery compartment. To hold side spacer 114 in place, side spacer 114 may be provided with an opening 116 through which rod 46 can be positioned.

It is thus within the scope of this invention to provide suitable spacers that enhance the versatility of the battery tray modules by allowing facile means to adapt a single-sized module for use with batteries of varying sizes. Other suitable spacers that accomplish this purpose can, of course, be used.

The C-shaped configuration of the battery cabinet assembly of the present invention allows, as may be appreciated, ready access to each of the batteries positioned in the assembly. After the front door (when used) is removed, personnel can enter the open area bounded on three sides by the stacked modular battery trays. The open area is more than adequate to provide the space necessary for testing, maintenance, and removal of any battery.

While providing a desirable configuration, it should be appreciated that the open area within the battery stack assembly of this invention affords, if desired, space for including even further batteries so as to further maximize use of the floor space. As one example, a battery tray module stack similar to the illustrative embodiments but dimensioned to fit within the open area could be employed, if desired. Other configurations could be used as well. Of course, occupying that open area restricts the otherwise facile access.

The battery cabinet assembly of the present invention is inexpensive to manufacture and assemble. Any suitable materials can be used for the various components. Materials found suitable are structural steel, sheet steel, sheet metal and the like. However, any other material may be used that satisfy the strength and other requirements as discussed herein. Thus, aluminum, fiberglass and plastics might also be suitable for some applications.

Thus, as has been seen, the modular battery cabinet system of the present invention provides the ability to retain batteries in a highly efficient, yet inexpensive fashion, while still providing ready access to the batteries. The footprint required may be minimized, and the flexibility that may be obtained for the many diverse applications is substantial.

What is claimed is:

1. A modular battery tray assembly for housing multiple batteries comprising a plurality of battery trays stacked one upon the other and attached together, each battery tray comprising a back section and opposing side sections each said side section having a front end and a back end, the back end connected to said back section and said front ends being unconnected with each other, said back and opposing side sections forming a C-shaped configuration when viewed from above, said opposing side sections disposed to provide access to each of the batteries housed through an open side opposite said back section, at least two of said sections including at least one battery compartment sized to accommodate one of the batteries being housed, restraining means attached to said battery tray for retaining a battery within said battery compartment and attachment means associated with each of said battery trays for attaching a battery tray to another of said battery trays.

2. The modular battery tray assembly of claim 1, wherein said restraining means retains the battery from movement in at least two directions within the battery compartment.

3. The modular battery tray assembly of claim 2, wherein said restraining means retains the battery within said battery compartment against movement side-to-side, front-to-back and up and down within the battery compartment.

4. The modular battery tray assembly of claim 1, wherein said battery compartment comprises a back wall, a base having an upstanding lip dimensioned to snugly hold a battery from front-to-back movement between lip and said backwall and side panels dimensioned to prevent a battery within said battery compartment from side-to-side movement.

5. The modular battery tray assembly of claim 4, wherein said side panels are angled so as to facilitate attachment of a handle to a battery retained in said battery compartment.

6. The modular battery tray assembly of claim 4, wherein said side panels have apertures for air movement.

7. The modular battery tray assembly of claim 4, wherein said side panels contain an aperture for accepting a restraining means for preventing movement of a battery positioned in said battery compartment from up and down movement.

8. The modular battery tray assembly of claim 7, wherein said aperture is L-shaped.

9. The modular battery tray assembly of claim 8, wherein said restraining means is an L-shaped rod capable of being inserted through said L-shaped apertures and wherein said L-shaped apertures are positioned such that said L-shaped rod is positioned on the top of a battery located in a battery compartment.

10. The modular battery tray assembly of claim 1, wherein said attachment means comprises a structural extension member located adjacent each of the four corners of the tray battery and extending below said battery tray, an opening in the top of each corner of the battery tray for accepting said structural extension member of a complementary battery tray, and apertures for accepting means for attaching said battery tray to another battery tray.

11. The modular battery tray assembly of claim 1, which includes a top cover.

12. The modular battery tray assembly of claim 1, which includes a front door restricting access to the open side opposite said back section.

13. The modular battery tray assembly of claim 12, wherein said front door includes means for locking said front door to said battery tray assembly.

14. The modular battery tray assembly of claim 1, which includes a base attached to the bottom battery tray of said battery tray assembly.

15. The modular battery tray assembly of claim 14, wherein said base includes access means for allowing a lifting mechanism to lift said modular battery tray assembly.

16. The modular battery tray assembly of claim 15, wherein said base has means allowing attachment of said base to a floor.

17. The modular battery tray assembly of claim 1, wherein each of said sections includes at least one battery compartment.

18. A battery cabinet assembly for housing multiple batteries comprising a plurality of battery tray modules stacked one upon another and attached together, each module comprising a back section and opposing side sections each said side section having a front end and a back end, the back end connected to said back section and said front ends being unconnected with each other, said back and opposing side sections forming a C-shaped configuration when viewed from above, said opposing side sections disposed to provide access to each of the batteries housed through an open side opposite said back section, at least two of said sections including at least one battery compartment sized to accommodate one of the batteries being housed, restraining means associated with said module for retaining a battery within said battery compartment, a battery positioned in each of said battery compartments, said batteries being electrically connected together, and attachment means associated with each of said modules for attaching said module to another module.

19. The battery cabinet assembly of claim 18, which includes a top cover attached to the top module, a front door closing off the open side opposite said back section and a base attached to the bottom module.

20. The battery cabinet assembly of claim 19, wherein said front door includes means for locking said front door to said modules.

21. The battery cabinet assembly of claim 20, wherein said base includes means for attaching said base to a floor.

22. The battery cabinet assembly of claim 21, wherein said base includes access means for allowing a lifting mechanism to lift said battery cabinet assembly.

23. The battery cabinet assembly of claim 22, wherein each of said sections includes at least one battery compartment.

24. The modular battery tray assembly of claim 18, wherein said restraining means retains the battery from movement in at least two directions within the battery compartment.

25. The modular battery tray assembly of claim 24, wherein said restraining means retains the battery within said battery compartment against movement side-to-side, front-to-back and up and down within the battery compartment.

26. The modular battery tray assembly of claim 18, wherein said battery compartment comprises a back wall, a base having an upstanding lip dimensioned to snugly hold a battery from front-to-back movement between lip and said backwall and side panels dimensioned to prevent a battery within said battery compartment from side-to-side movement.

27. The modular battery tray assembly of claim 26, wherein said side panels are angled so as to facilitate attachment of a handle to a battery retained in said battery compartment.

28. The modular battery tray assembly of claim 26, wherein said side panels have apertures for air movement.

29. The modular battery tray assembly of claim 26, wherein said side panels contain an aperture for accepting a restraining means for preventing movement of a battery positioned in said battery compartment from up and down movement.

30. The modular battery tray assembly of claim 29, wherein said aperture is L-shaped.

31. The modular battery tray assembly of claim 29, wherein said restraining means is an L-shaped rod capable of being inserted through said L-shaped apertures and wherein said L-shaped apertures are positioned such that said L-shaped rod is positioned on the top of a battery located in a battery compartment.

32. The modular battery tray assembly of claim 18, wherein said attachment means comprises a structural extension member located adjacent each of the four corners of the battery tray and extending below said battery tray, an opening in the top of each corner of the battery tray for accepting said structural extension member of a complementary battery tray, and apertures for accepting means for attaching said battery tray to another battery tray.

33. A pre-wired battery tray module for housing multiple batteries comprising a back section and opposing side sections each said side section having a front end and a back end, the back end connected to said back section and said front ends being unconnected with each other, said back and opposing side sections forming a C-shaped configuration when viewed from above, said opposing side sections disposed to provide access to each of the batteries being housed through an open side opposite said back section, at least two of said sections including at least one battery compartment sized to accommodate one of the batteries being housed, a battery positioned in each of said battery compartments, connections electrically connecting said batteries and attachment means associated with said module for attaching said module to another module.

34. A modular battery tray assembly for housing multiple batteries comprising a plurality of battery trays stacked one upon the other and attached together, each battery tray comprising a back section and opposing side sections each said side section having a front end and a back end, the back end connected to said back section and said front ends being unconnected with each other, said back and opposing side sections forming a C-shaped configuration when viewed from above, said opposing side sections disposed to provide access to the batteries housed through an open side opposite said back section, at least two of said sections including at least one battery compartment sized to accommodate one of the batteries being housed, restraining means attached to said battery tray for retaining a battery within said battery compartment and restraining the battery from movement in at least two directions within the battery compartment, a battery positioned in each compartment, and attachment means associated with each of said battery trays for attaching a battery tray to another of said battery trays.

* * * * *